J. H. Walker.
Hay Fork.
No. 77,136.  Patented April 21, 1868.
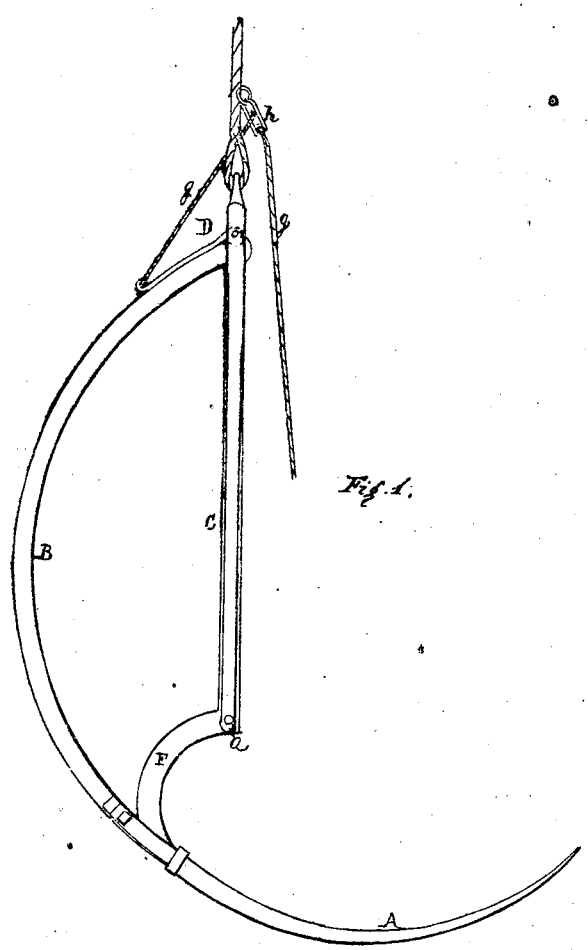
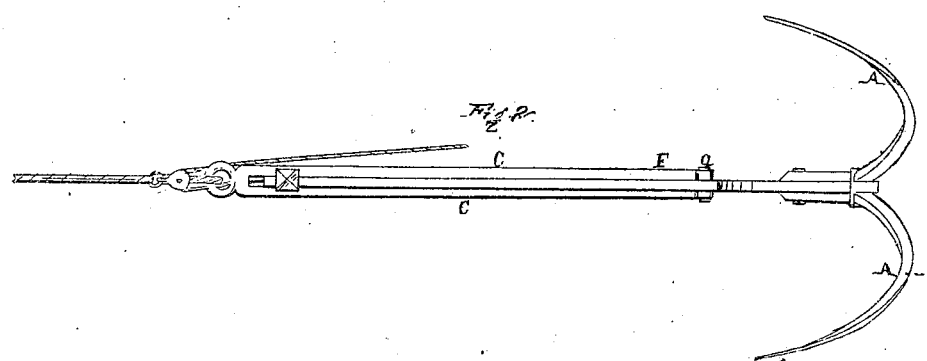
Witnesses
V. D. Stockbridge
A. N. Marr
Inventor
J. H. Walker
per
Alexander Mason

United States Patent Office.

JOSEPH H. WALKER, OF GRAND RAPIDS, MICHIGAN.

Letters Patent No. 77,136, dated April 21, 1868.

IMPROVEMENT IN HORSE HAY-FORKS.

The Schedule referred to in these Letters Patent and making part of the same.

TO ALL WHOM IT MAY CONCERN:

Be it known that I, JOSEPH H. WALKER, of Grand Rapids, in the county of Kent, and in the State of Michigan, have invented certain new and useful Improvements in Horse Hay-Forks; and do hereby declare that the following is a full, clear, and exact description thereof, reference being had to the accompanying drawings, and the letters of reference marked thereon.

In the annexed drawings, making a part of this specification, A A represent the tines of my horse hay-fork, and B represents a curved or bent bar, to which, and the bar F, the tines A A are securely bolted or fastened.

F represents a cross-bar, made in the form shown, and extends across and connects the two ends of the curved bar B.

The bar F is pivoted between the lower ends of the metallic straps or jaws C C, at $a$, which is above and in front of the head of the fork-tines A A, thus bringing the weight under the power, thereby making the fork less liable to pitch forward when loaded.

The upper part of the bar F and the curved bar B work and swing between the metallic straps C C.

The upper end of the curved bar B is provided with a head, to prevent it from being carried back too far, and with a suitable recess, in which catches the projection of the cam-lever D.

The metallic straps C C have an eye or loop at their upper ends, in which is secured a rope or strap, to which power is applied to elevate the fork.

D represents a cam-lever, the projection of which catches in a recess in the upper end of the curved bar B, and holds the same firmly in place as long as desired.

When it becomes necessary to detach the cam-lever from its lock with the bar B, the operator raises the outer end of the lever by means of a small cord, $g$, secured thereto, and passing up over a pulley, $h$, and thence down to the ground, or within reach of the operator.

When the lever is thus detached, the weight of the object on the tines A A readily turns the fork on its pivot, $a$, and said object slips off from the same.

To use this fork, the operator detaches the cam-lever D, and brings the tines A A to nearly a vertical position, when they are readily thrust into the hay or straw, when the fork is turned so as to lock the lever D with the upper end of the curved bar B, and then power is applied to the main cord or strap, and the hay and fork are elevated as high as may be desired.

As many tines, A A, may be used as may be thought desirable.

Having thus fully described my invention, what I claim as new, and desire to secure by Letters Patent, is—

The cam-lever D, pivoted between the upper ends of the bars C C, and arranged to operate in combination with the curved bar B, when said bar is provided with a stop at its end, and a recess, as described, all constructed and operating substantially as specified.

In testimony that I claim the foregoing, I have hereunto set my hand, this 12th day of February, 1868.

JOS. H. WALKER.

Witnesses:
J. W. PIERCE,
H. WILLARD.